US011513488B2

(12) United States Patent
Uthaicharoenpong et al.

(10) Patent No.: US 11,513,488 B2
(45) Date of Patent: Nov. 29, 2022

(54) CONTROLLING POWER OF ELECTRONIC DEVICES ON A VEHICLE

(71) Applicant: Motional AD LLC, Boston, MA (US)

(72) Inventors: Tawit Uthaicharoenpong, Singapore (SG); Yee Keng Cheah, Singapore (SG); Michael Maass, Pittsburgh, PA (US); Justin Poh, Waltham, MA (US); Michael O'Har, Pittsburgh, PA (US); Upasana Lnu, Sewickley, PA (US)

(73) Assignee: Motional AD LLC, Boston, MA (US)

( * ) Notice: Subject to any disclaimer, the term of this patent is extended or adjusted under 35 U.S.C. 154(b) by 95 days.

(21) Appl. No.: 17/017,656

(22) Filed: Sep. 10, 2020

(65) Prior Publication Data
US 2022/0075338 A1   Mar. 10, 2022

(51) Int. Cl.
  *G05B 19/042*  (2006.01)
  *H04L 67/12*  (2022.01)
  *H04L 12/40*  (2006.01)
(52) U.S. Cl.
  CPC .......... *G05B 19/042* (2013.01); *H04L 67/12* (2013.01); *G05B 2219/2639* (2013.01); *H04L 12/40039* (2013.01); *H04L 12/40045* (2013.01); *H04L 2012/40215* (2013.01)
(58) Field of Classification Search
  CPC .......... G05B 19/042; G05B 2219/2639; H04L 67/12; H04L 12/40039; H04L 12/40045; H04L 2012/40215
  See application file for complete search history.

(56) References Cited

U.S. PATENT DOCUMENTS

| 2004/0124703 | A1  | 7/2004 | Tani et al. |
| 2007/0120530 | A1* | 5/2007 | Nozaki ............... H02J 7/0047 320/130 |
| 2007/0202371 | A1* | 8/2007 | Takeda ............... G01R 31/396 429/432 |
| 2011/0234231 | A1* | 9/2011 | Liu .................... G01R 31/3842 324/429 |
| 2017/0131378 | A1* | 5/2017 | Murata ................... B60L 1/00 |

(Continued)

FOREIGN PATENT DOCUMENTS

| EP | 3587194 | 1/2020 |
| EP | 3659850 | 6/2020 |

OTHER PUBLICATIONS

[No Author Listed], "SAE International: Surface Vehicle Recommended Practice: Taxonomy and Definitions for Terms Related to Driving Automation Systems for on-Road Motor Vehicles," J3016, Sep. 30, 2016, 30 pages.

*Primary Examiner* — Gary Collins
(74) *Attorney, Agent, or Firm* — Fish & Richardson P.C.

(57) ABSTRACT

Among other things, techniques are described for controlling power of electronic devices of a vehicle. For example, a vehicle includes a power source, a power distribution unit configured to control power to at least one electronic device from the power source, a first processor configured for communicating power commands to the power distribution unit. The power distribution unit comprises a second processor configured to execute computer executable instructions stored in computer-readable medium for carrying out operations including adjusting a power distribution from the vehicle power source to the at least one electronic device based on a power command received from the first processor.

30 Claims, 15 Drawing Sheets

(56) References Cited

U.S. PATENT DOCUMENTS

2019/0210545 A1    7/2019  Sangameswaran et al.
2019/0366956 A1   12/2019  Kim
2020/0092375 A1*   3/2020  Clark .................... H04L 9/3249
2020/0223444 A1    7/2020  Bonanni

* cited by examiner

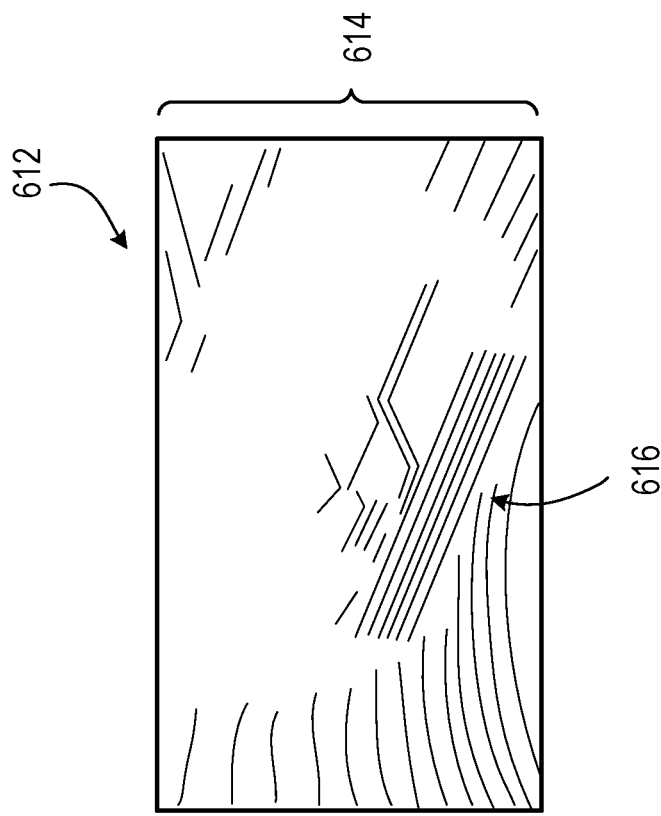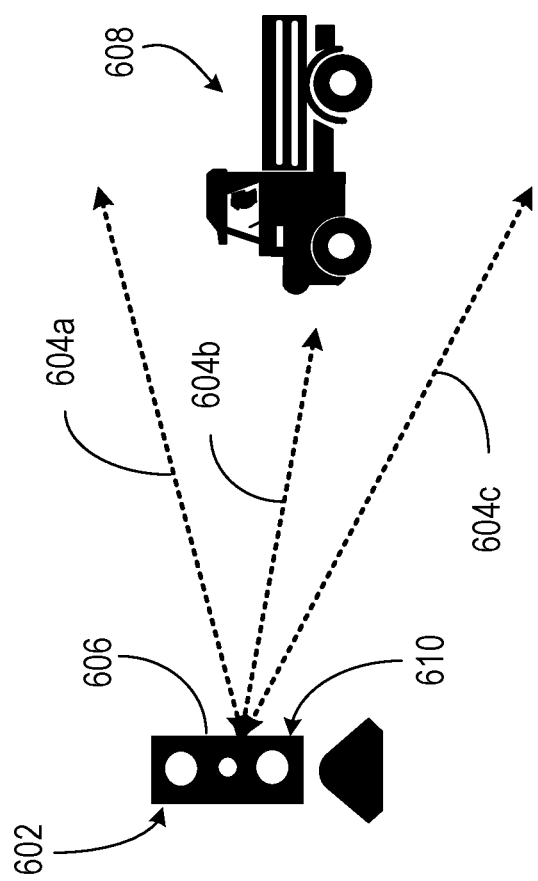
FIG. 6

CONTROLLING POWER OF ELECTRONIC DEVICES ON A VEHICLE

FIELD OF THE INVENTION

This description relates to controlling power of electronic devices of a vehicle, e.g., an autonomous vehicle.

BACKGROUND

Vehicles, such as autonomous vehicles, typically include electronic devices powered by one or more central power sources, such as a battery. Some of the devices may be powered on while the vehicle is in operation, and some of the devices may be powered on, powered off, or power-cycled during operation.

BRIEF DESCRIPTION OF THE DRAWINGS

FIG. 6 shows an example of a LiDAR system.

DETAILED DESCRIPTION

Figure 1:
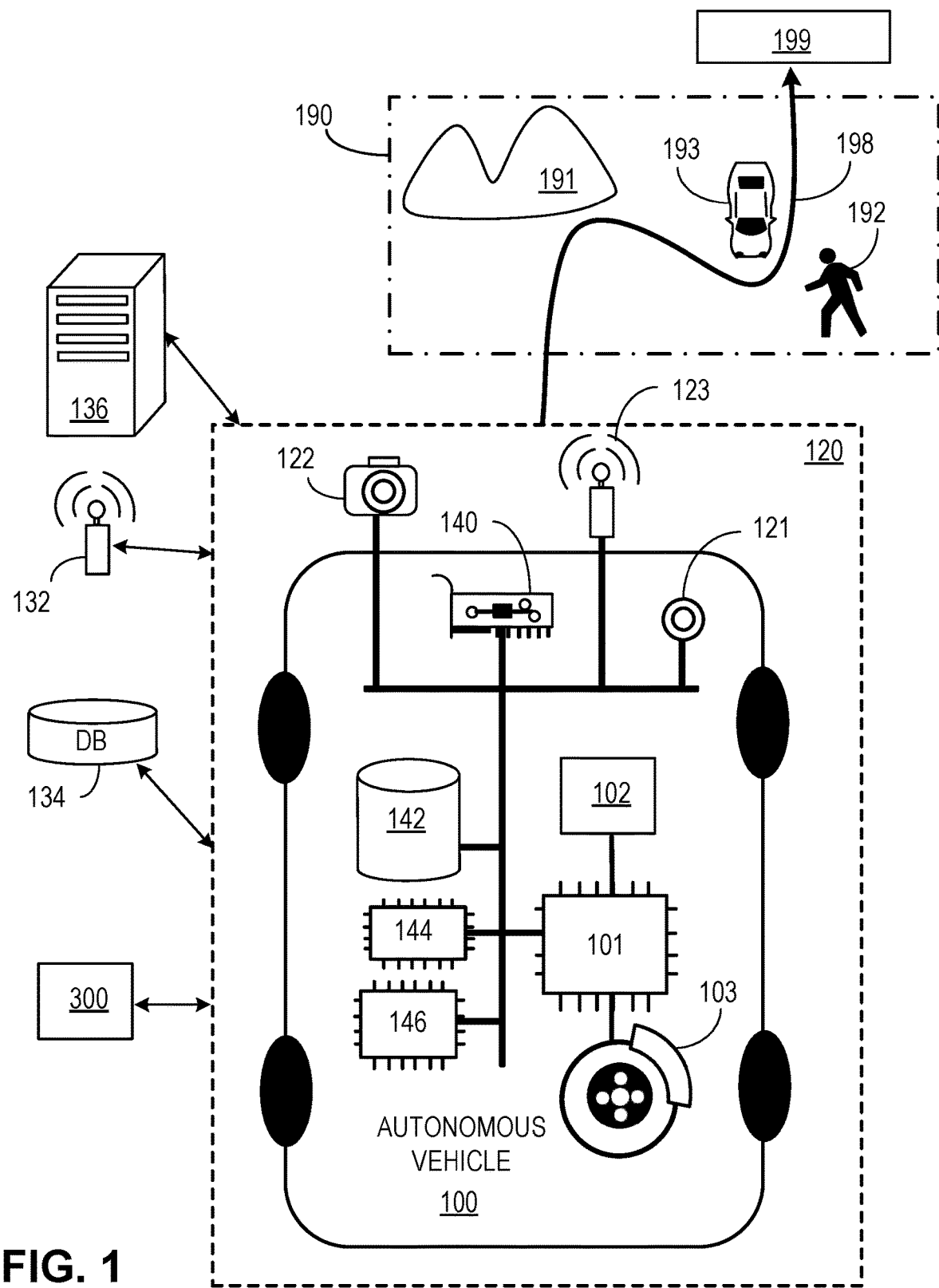
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Power Distribution General Overview A power distribution unit of a vehicle can be configured to verify the authenticity and validity of commands to control power of individual electronic devices of the vehicle. The power distribution unit can also monitor the devices to determine if they are operating within expected parameters and deactivate a device experiencing an unusual condition (e.g., a current spike).

Some of the advantages of these techniques are as follows. Commands to activate or deactivate a device can be authenticated to confirm they are authorized and not provided by a malicious actor. Authenticated commands can be evaluated to determine that they won't cause harm to the vehicle. An electronic device can be securely power-cycled after an event such as a firmware update. An electronic device can be quickly powered off if a current spike or similar event is detected, mitigating or preventing electrical damage. The health (functionality) of an electronic device can be monitored based on its measured power draw.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving manuever). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
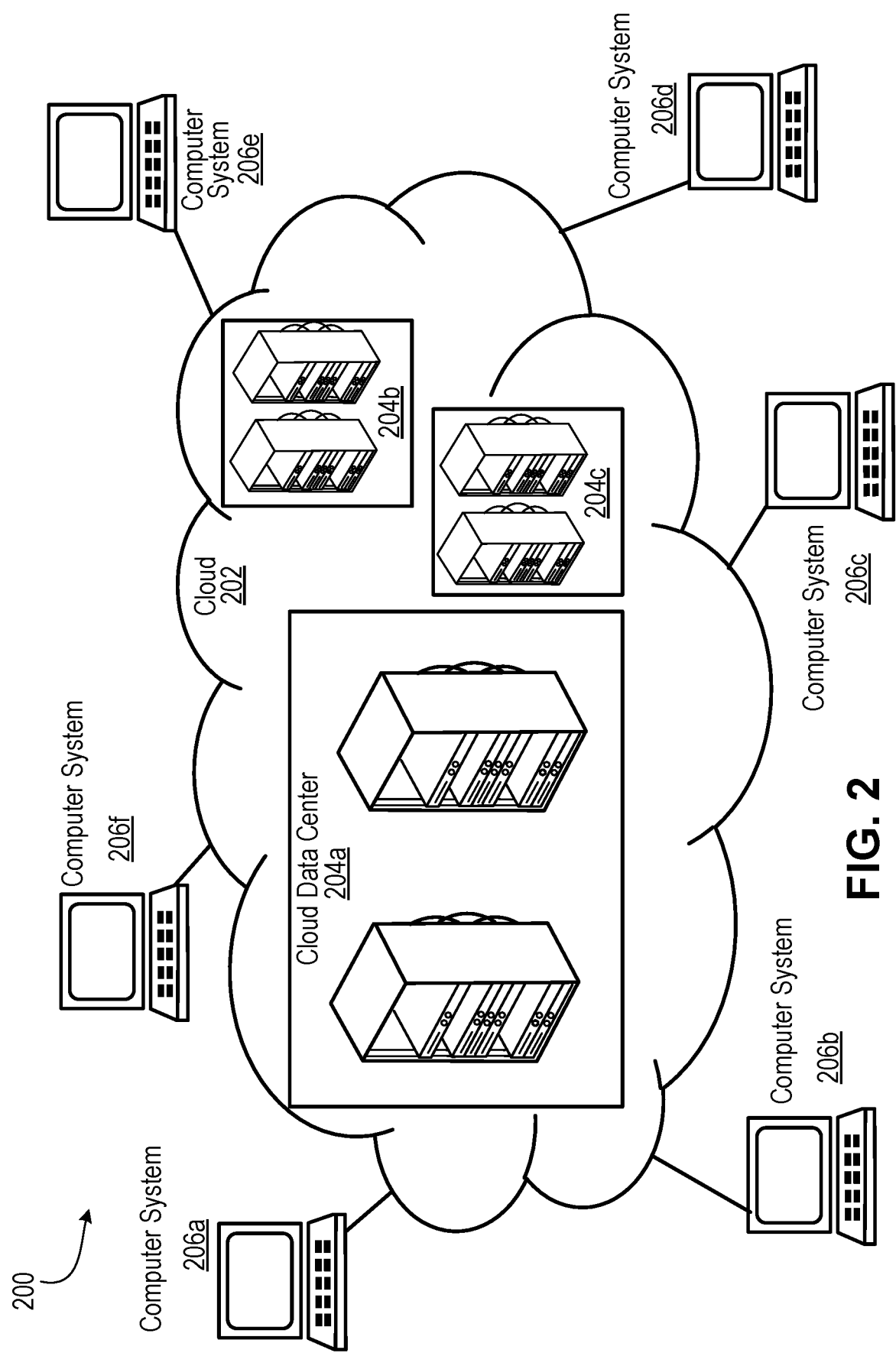
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
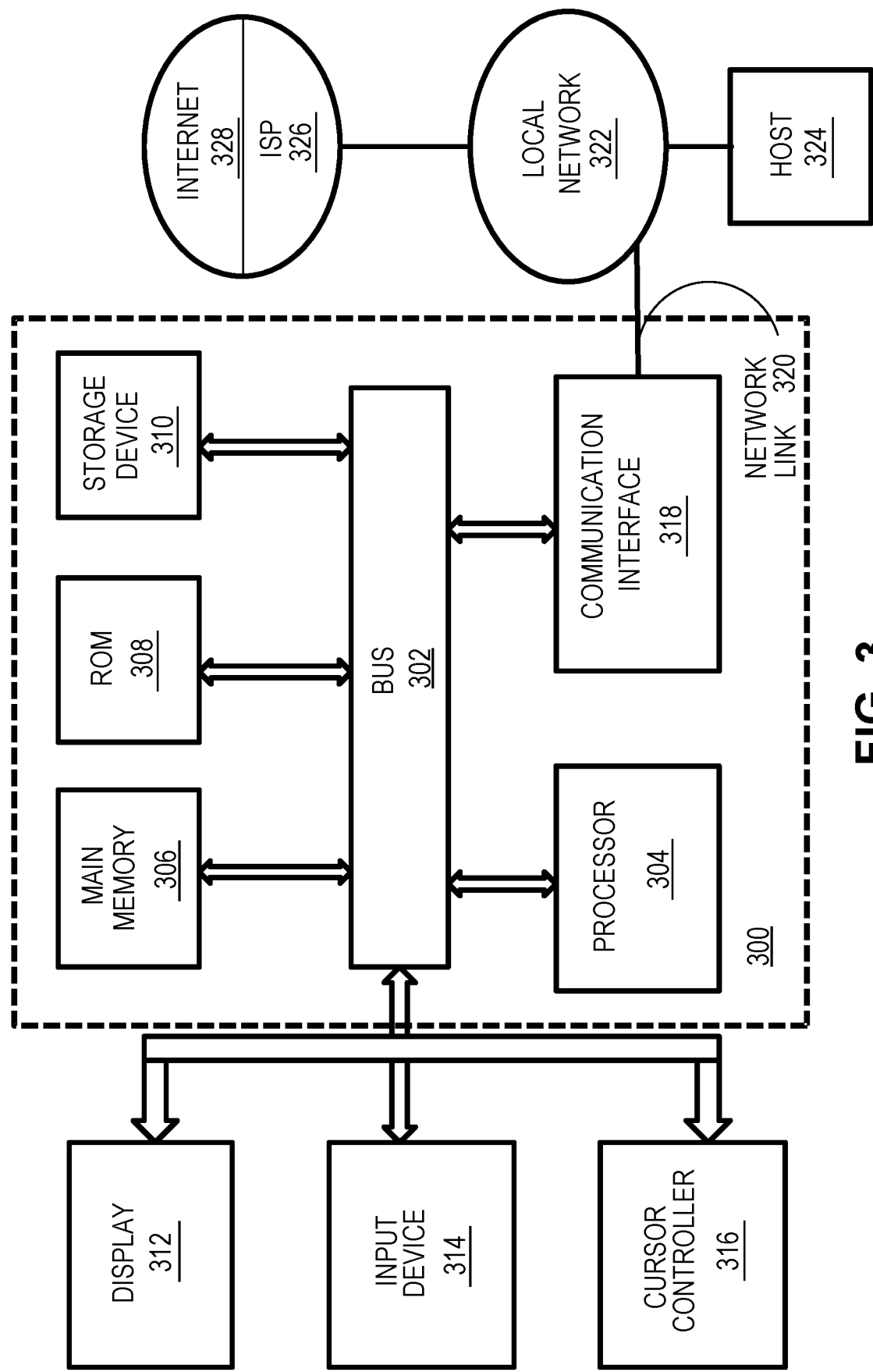
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
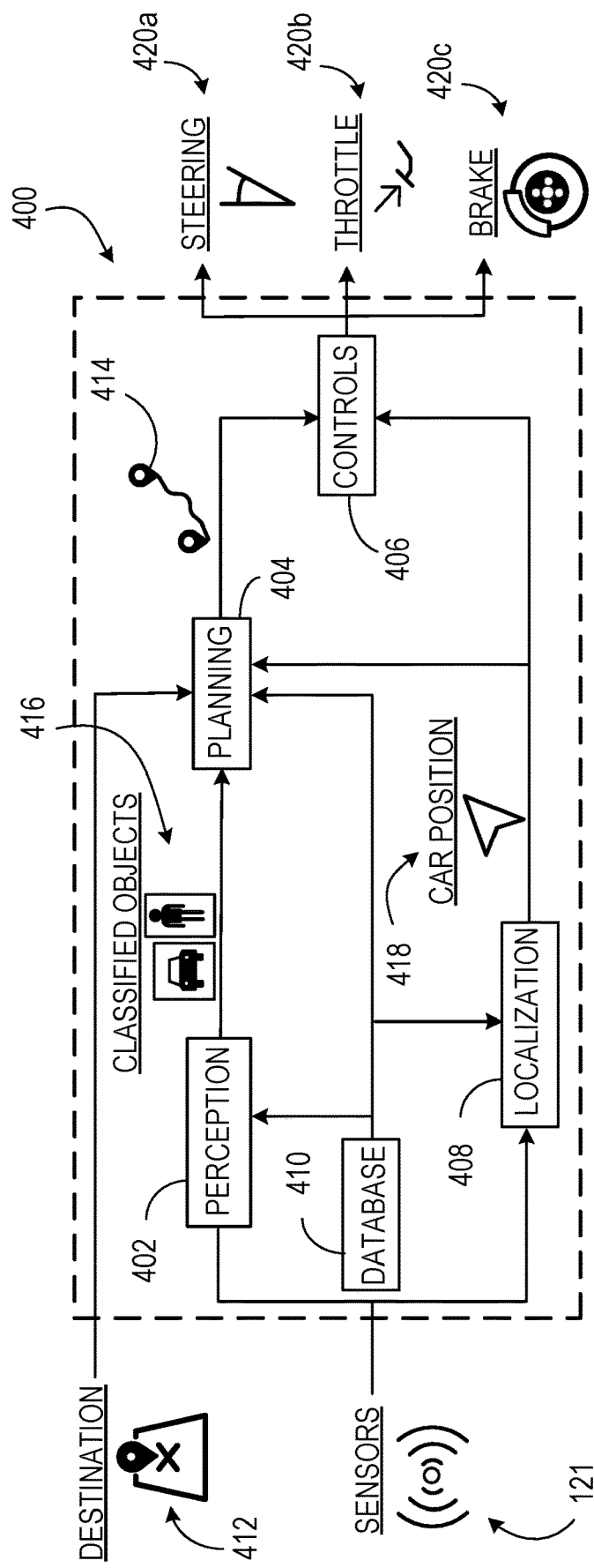
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
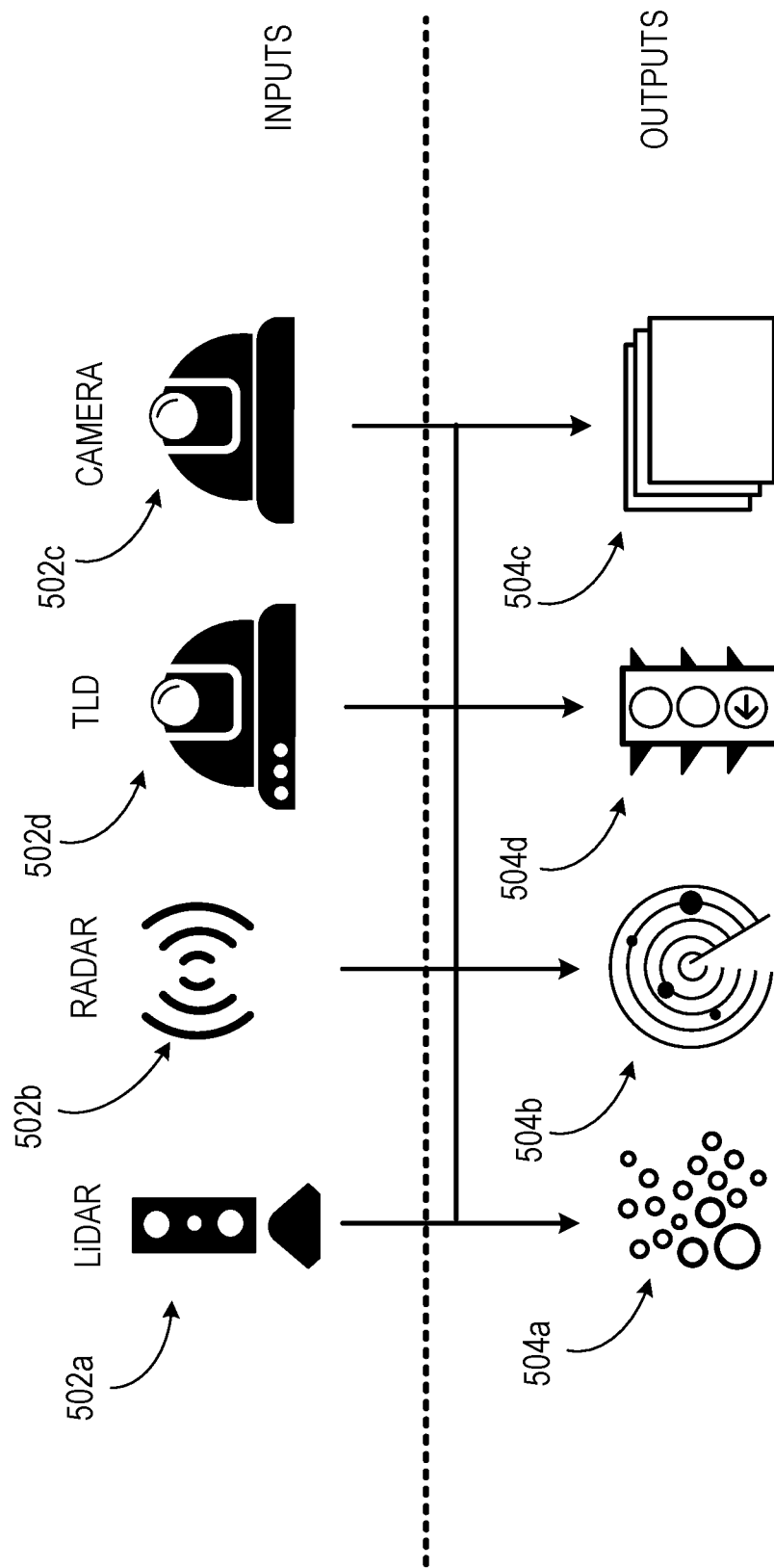
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
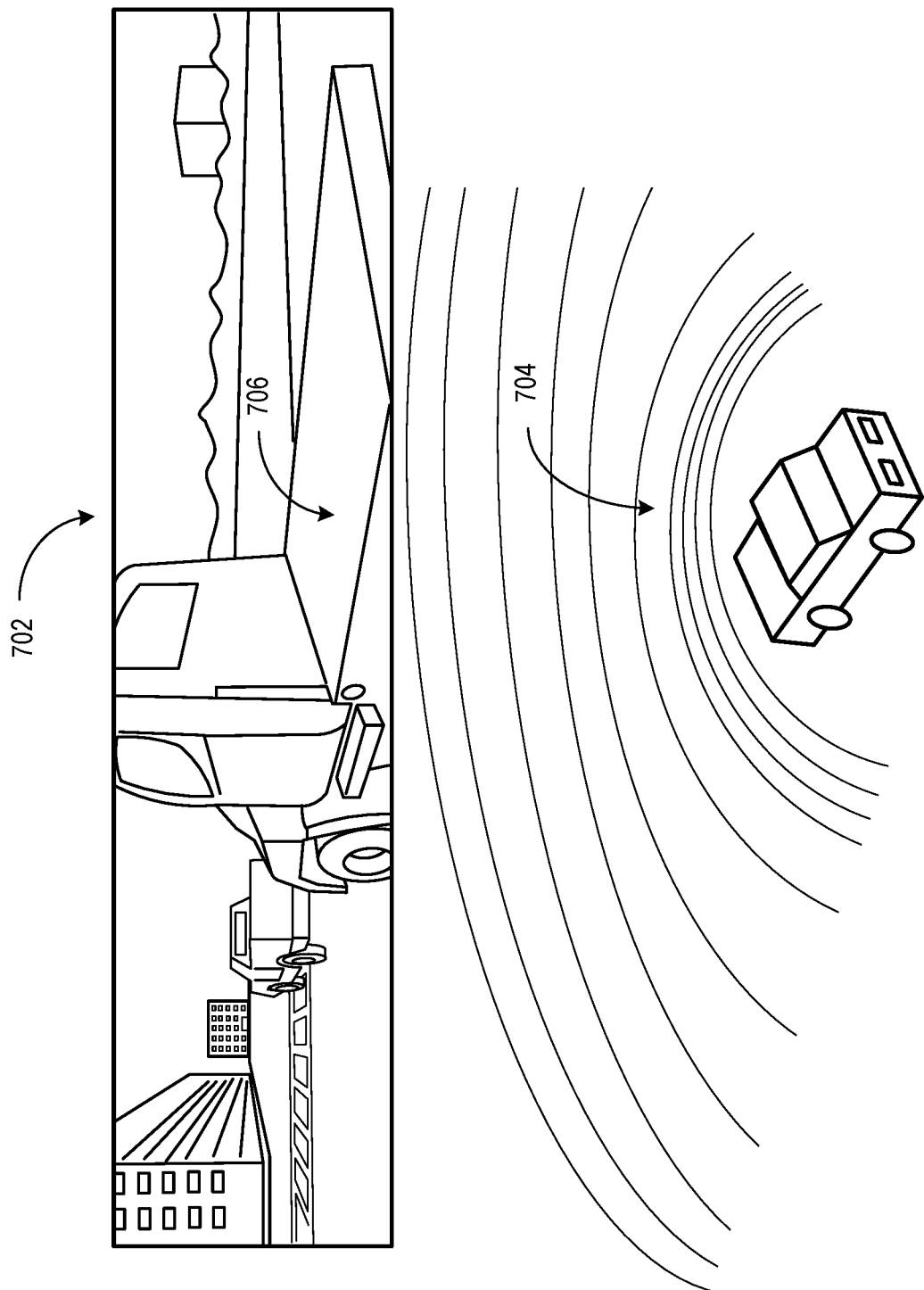
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
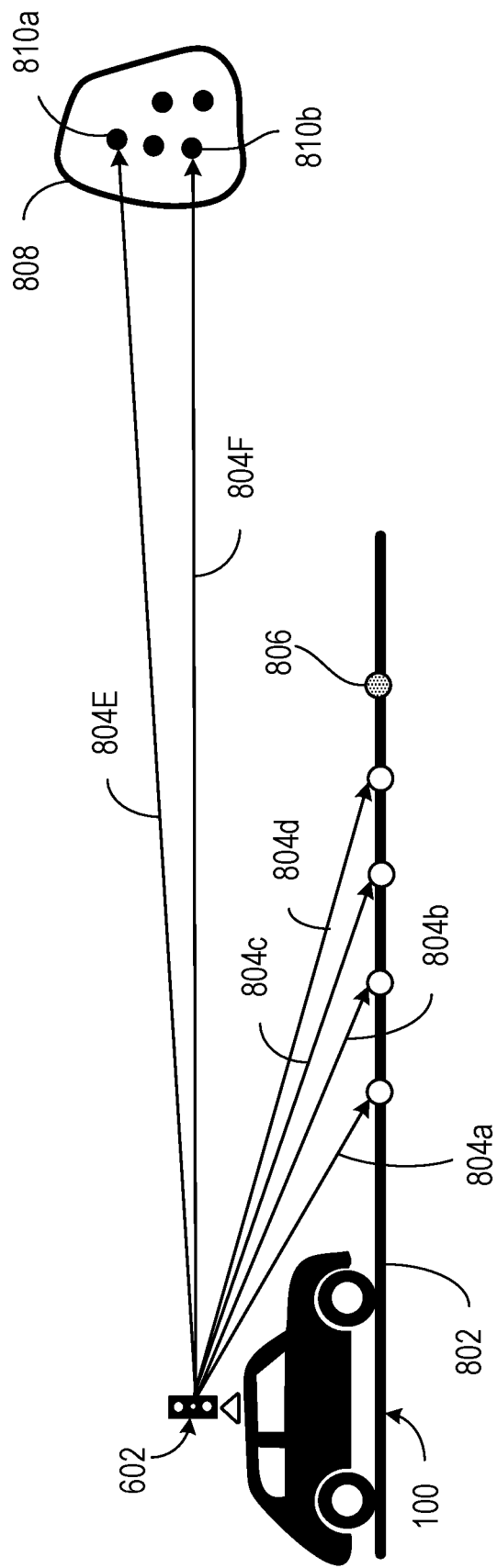
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
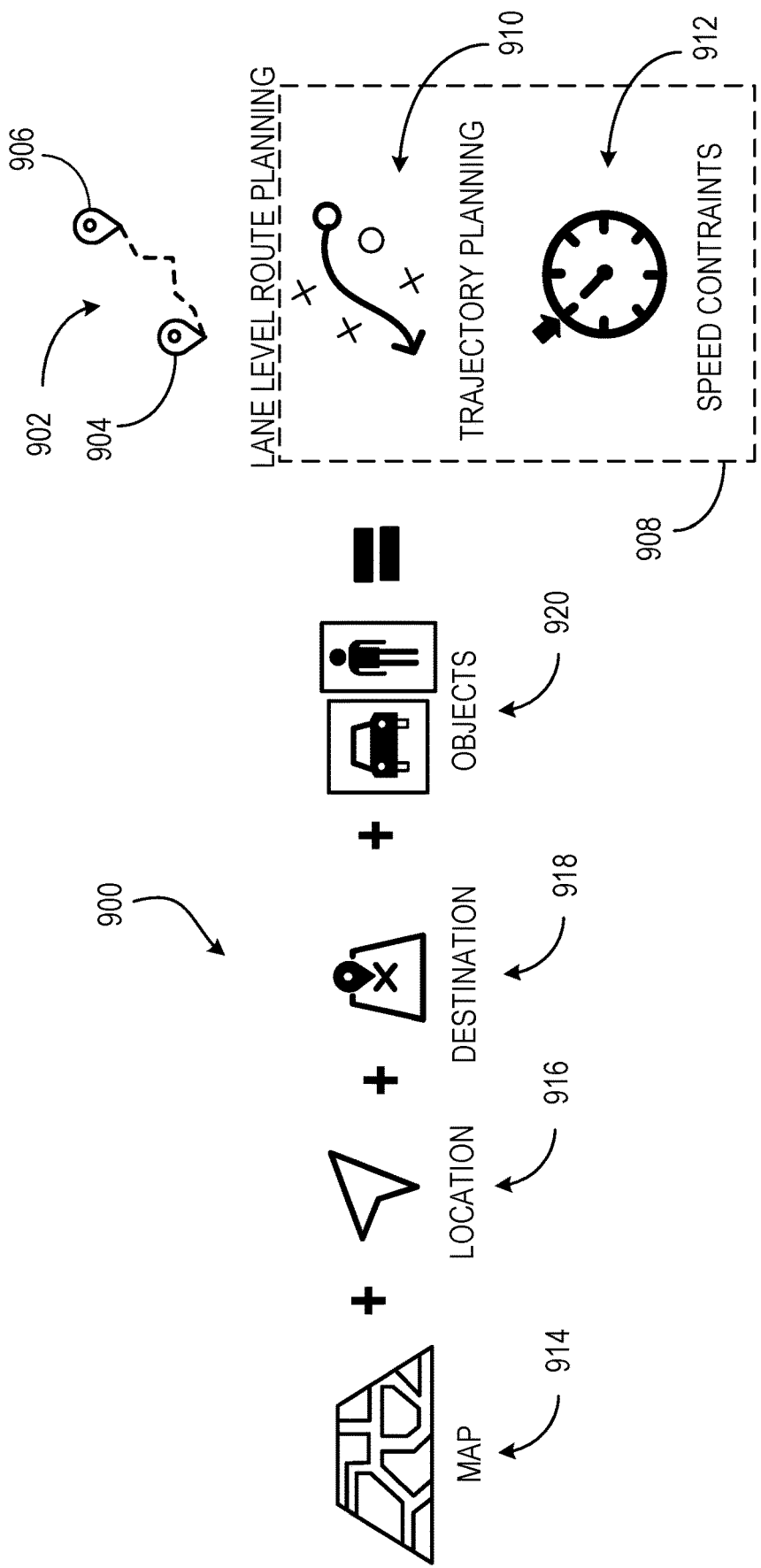
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
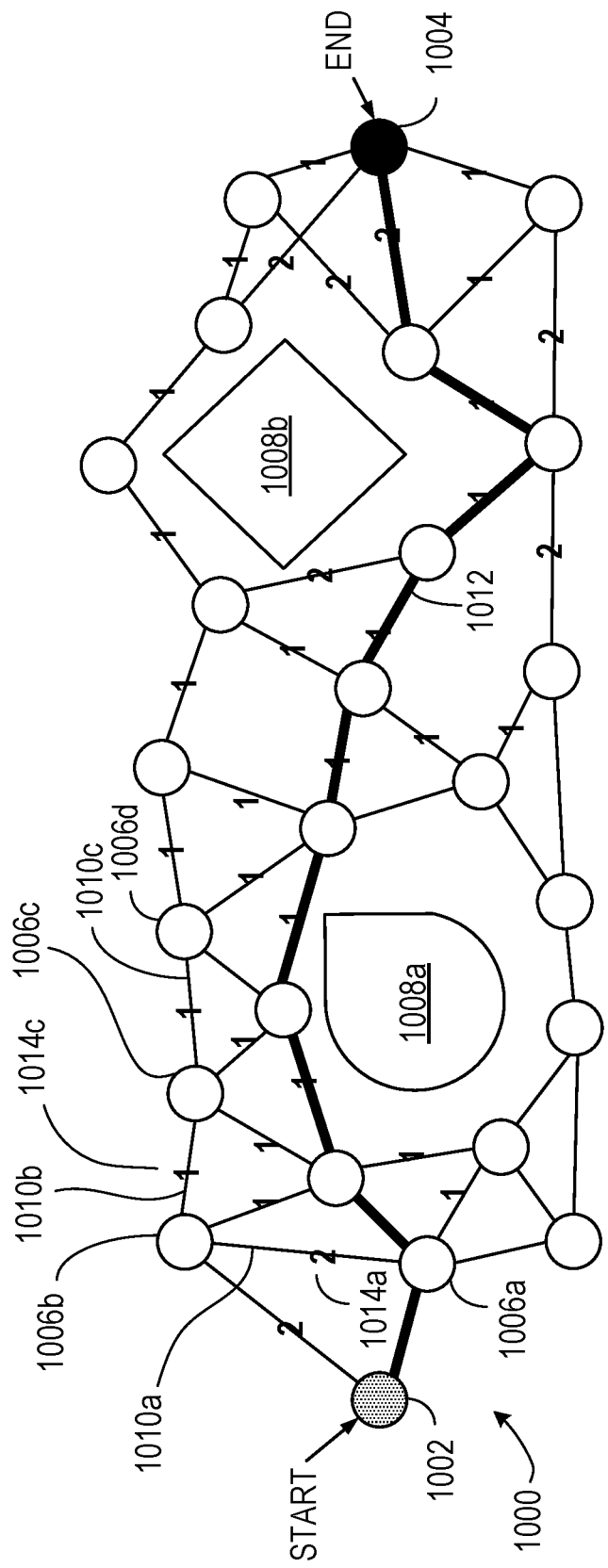
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
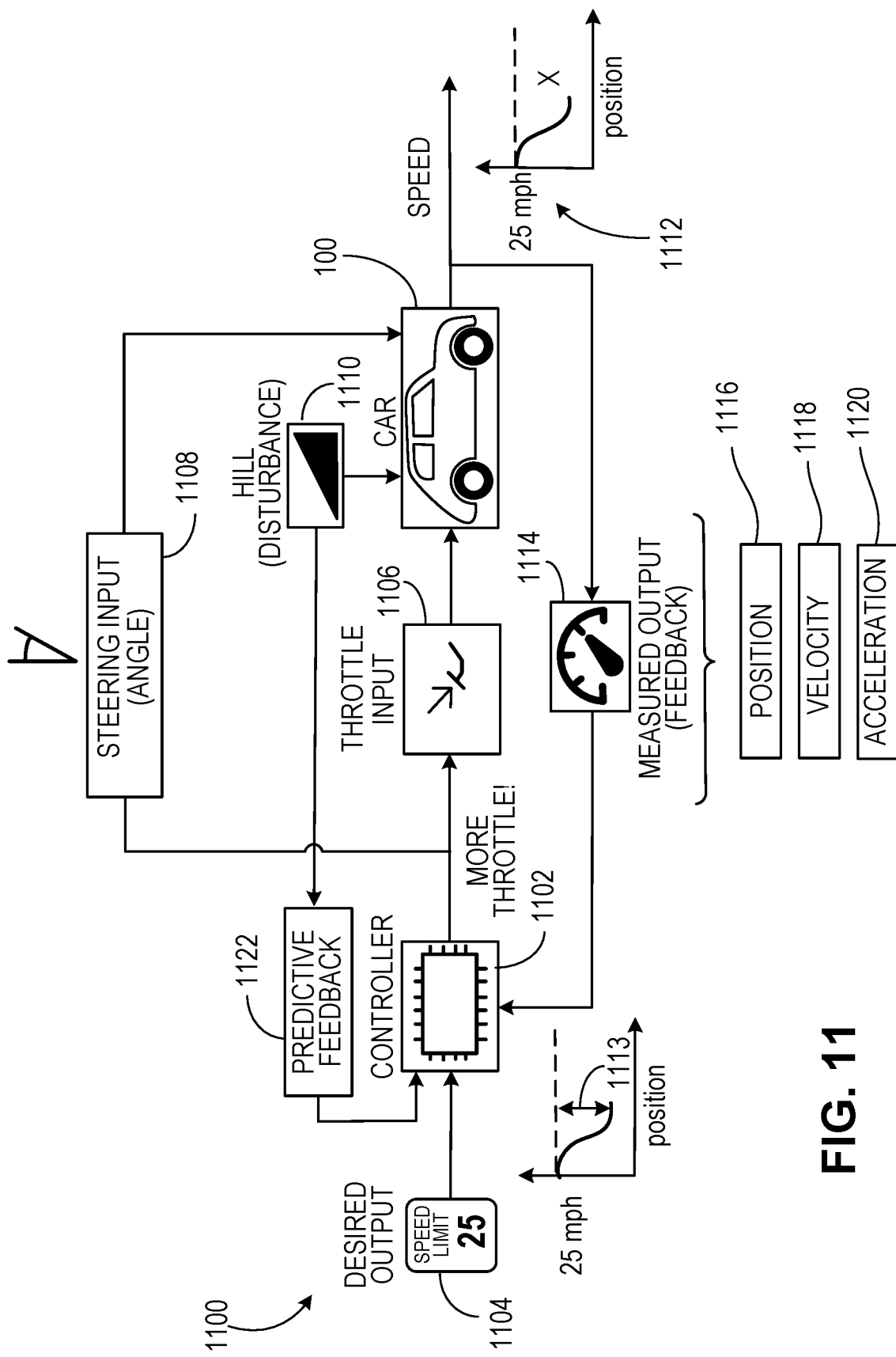
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
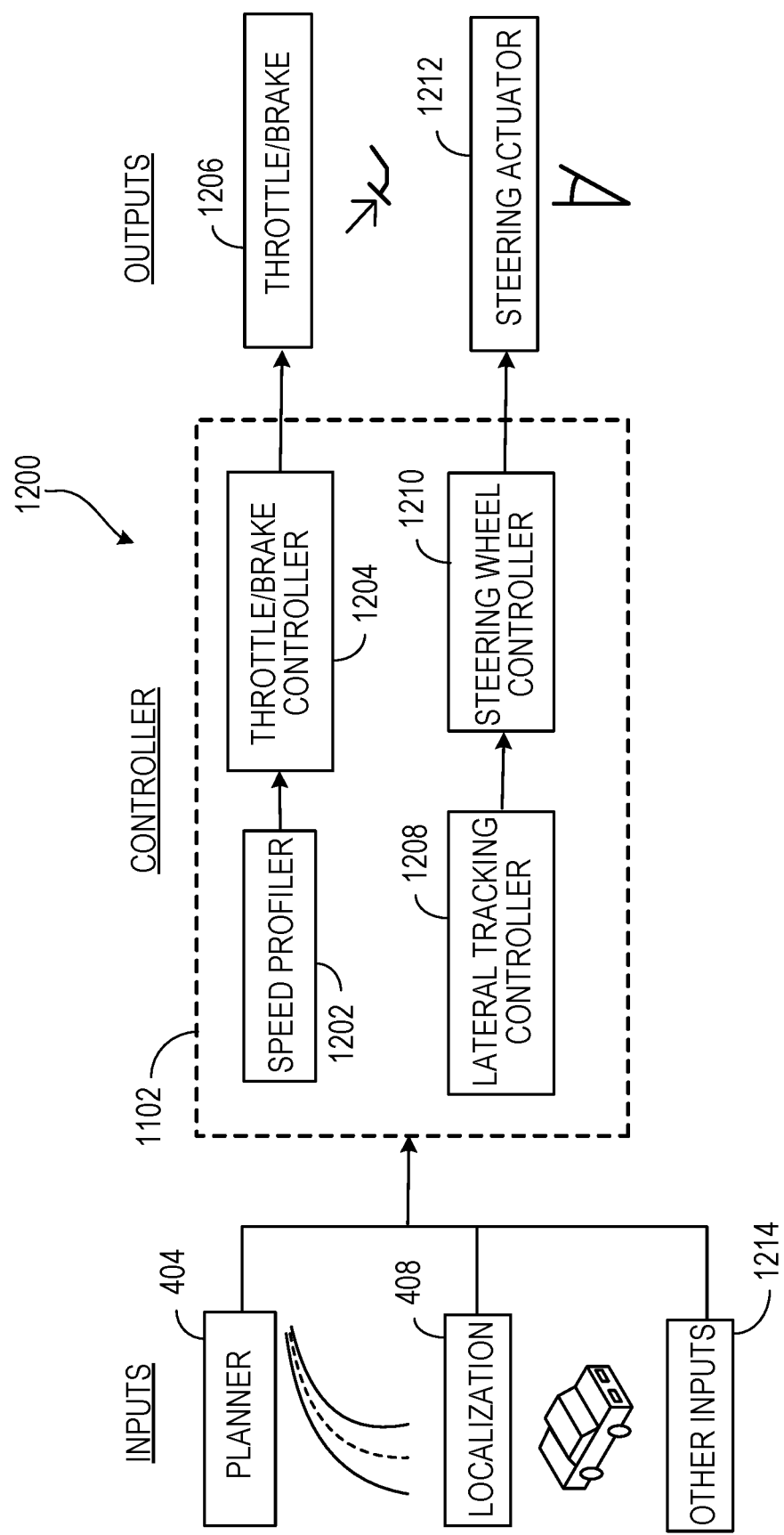
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Power Distribution

Figure 13:
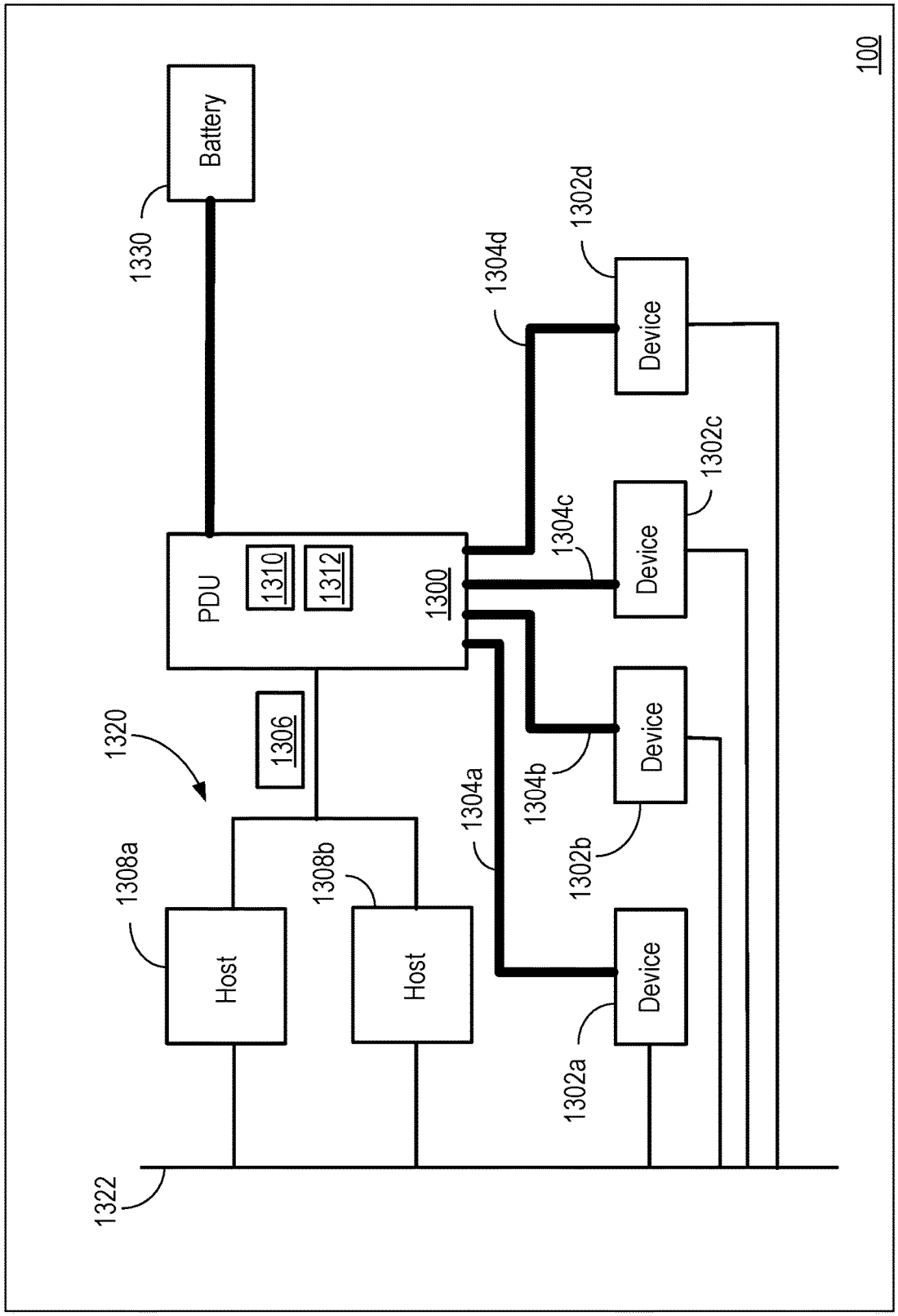
FIG. 13 shows a power distribution unit and associated components in an autonomous vehicle.

FIG. 13 shows a power distribution unit 1300 and associated components in an autonomous vehicle 100. In general, a power distribution unit 1300 controls power to other electronic devices 1302a-d of a vehicle 100. In an embodiment, the power distribution unit 1300 is electrically connected to the electronic devices 1302a-d. For example, each electronic device 1302a-d has a respective channel 1304a-d to the power distribution unit 1300. The channels 1304a-d are individually controllable by the power distribution unit 1300. In an embodiment, the channels 1304a-d include physical electrical connections (e.g., physical ports and physical power cables).

The devices 1302a-d may be examples of the devices 101 described above with respect to FIG. 1. In an embodiment, some of the devices 1302a-d are sensors 121. Some of the devices 1302a-d have their own processors and associated memory. For example, a device 1302a-d has a memory device (e.g., flash memory) containing program code executable on a respective processor (e.g., microprocessor or microcontroller). As described in more detail below, such devices sometimes receive updates to their program code and are accordingly power-cycled by the power distribution unit 1300.

The power distribution unit 1300 is configured for powering up, powering down, and power-cycling any of the electronic devices 1302a-d to which it is connected. As used herein, "power up," means the power distribution unit 1300 applies a voltage to the corresponding electrical connection to enable the corresponding electronic device 1302a-d to draw current and thus activate. As used herein, "power down," means the power distribution unit 1300 withdraws voltage from the corresponding electrical connection to cause the corresponding electronic device 1302a-d to deactivate. In an embodiment, the power distribution unit 1300 powers on or powers off a device by electrically actuating a switch, e.g., a transistor or other electronic component. As used herein, "power cycle," sometimes called "reset," means the power distribution unit 1300 powers off and then powers on a device in relatively short succession (e.g., within a few seconds of each other or less). Power cycling is sometimes used to cause an electronic device to enter an activation sequence, e.g., using newly installed program code that executes as part of the activation sequence.

The power supplied by the power distribution unit 1300 originates at a power source 1330 of the vehicle 100. In an embodiment, the power source 1330 is a battery, e.g., a lithium-ion battery. For example, the power distribution unit 1300 is electrically connected to the power source 1330, e.g., by a power cable. In an embodiment, the power distribution unit 1300 is electrically connected to multiple power sources 1330. For example, if one of the power sources 1330 is not supplying sufficient power (e.g., because the electronic devices 1302a-d are together drawing more power than what the power source is able to reliably provide, or because the power source has failed, etc.), the power distribution unit 1300 can use one or more additional power sources 1330 in addition to or instead of the first power source 1330.

The power distribution unit 1300 receives commands 1306 from one or more host devices 1308a-b. For example, the commands indicate to power on, power off, or power cycle a particular electronic device 1302a-d. In an embodiment, the power distribution unit 1300 and the host devices 1308a-b are in communication using a bus 1320, e.g., a CAN (controller area network) bus. In an embodiment, a host device 1308a is in communication with the electronic devices 1302a-d. However, the host device 1308a need not be configured to control power to the electronic devices 1302a-d. Instead, in an embodiment, only the power distribution unit 1300 controls power to the electronic devices 1302a-d, and the power distribution unit 1300 is configured to evaluate the commands 1306 (e.g., for validity and authenticity) before powering on, powering off, or power-cycling any of the electronic devices 1302a-d. In this way, the power distribution unit 1300 secures the devices 1302a-d from malignant activity, e.g., if a malicious entity gains control of any of the host devices 1308a-b.

In an embodiment, the power distribution unit 1300 has a processor 1310 (e.g., a microprocessor, microcontroller, or similar device) that executes instructions (e.g., program code) for processing the commands 1306. In an embodiment, the power distribution unit 1300 has a memory device 1312. For example, the memory device 1312 stores the instructions that are executed. In an embodiment, the memory device 1312 is a component of the processor 1310. For example, the memory device 1312 is integrated in the electronics package of the processor 1310, e.g., on-chip memory of a microcontroller. In an embodiment, the memory device 1312 is re-writeable, e.g., flash memory, which can be updated during the life of the power distribution unit 1300 to augment existing configurations or establish new or replacement configurations.

In an embodiment, the memory device 1312 stores data used to evaluate the commands 1306. For example, the memory device 1312 stores encryption keys used to authenticate digital signatures. As another example, the memory device 1312 contains configuration data. For example, the configuration data contains validity conditions that indicate whether a power command is appropriate or inappropriate, e.g., so that a command does not deactivate an essential device while the vehicle is in operation. In an embodiment, the memory device 1312 stores session configuration data, e.g., data indicating whether a particular host device 1308*a-b* is authorized to control power to a particular electronic device 1302*a-d*.

In an embodiment, a vehicle 100 has multiple power distribution units 1300. For example, one of the power distribution units 1300 controls power to some of the electronic devices 1302*a-d*, and another of the power distribution units 1300 controls power to some of the other electronic devices 1302*a-d*.

Figure 14:
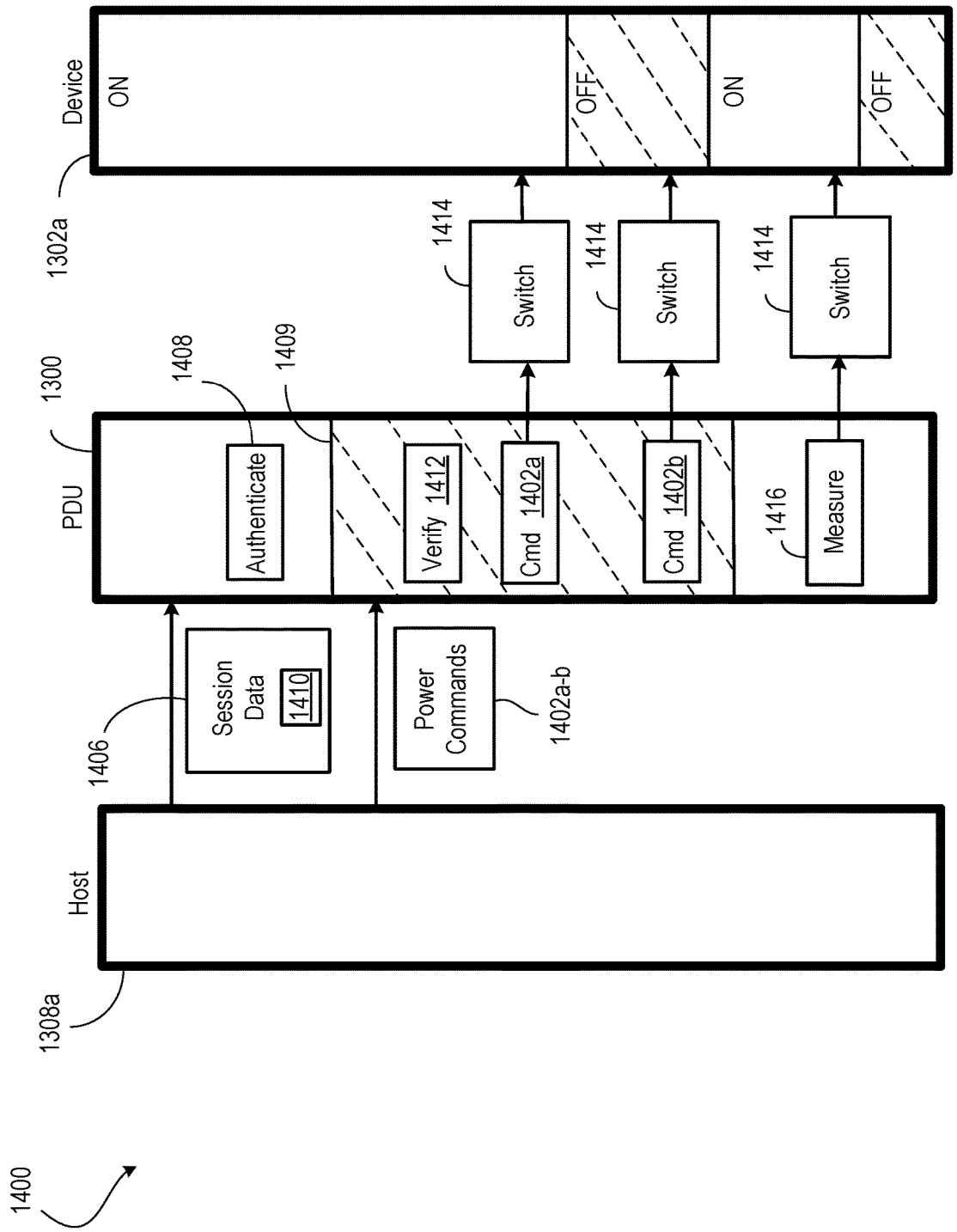
FIG. 14 shows an example of a power command scenario.

FIG. 14 shows an example of a power command scenario 1400 in which the power distribution unit 1300 receives a set of commands 1402*a-c* from a host device 1308*a*. This power command scenario 1400 represents an example scenario involving typical actions that occur during and surrounding a power command session 1404. The power distribution unit 1300 is configured for a variety of other sessions and other actions in addition to those shown here.

In this example scenario 1400, the host device 1308*a* requests initiation of a power command session by transmitting session data 1406 to the power distribution unit 1300. The session data 1406 specifies terms under which the power distribution unit 1300 should carry out the session. For example, the session data 1406 specifies a number of commands to be executed during the session and/or a time limit (e.g., number of milliseconds) for the session. In this way, the session is limited to scope intended by the host device 1308*a*. Absent a limit to the session, a malicious actor might try to insert additional commands into the session, e.g., if the actor takes control of communication between the host device 1308*a* and the power distribution unit 1300.

Next, the power distribution unit 1300 authenticates 1408 the session data 1406. For example, the power distribution unit 1300 authenticates the session data 1406, e.g., by verifying a digital signature 1410 included in the session data 1406. If the digital signature is determined to be valid, a session 1404 is initiated. During the session 1404, the host device 1308*a* is authorized to issue power commands 1402*a-b*.

In an embodiment, the digital signature 1410 was generated based on a private key available to the power distribution unit 1300 but not available to the host device 1308*a*. In this example, the session data 1406 was pre-generated for the host device 1308*a* and cannot be generated by the host device 1308*a*. In this way, the session data 1406 can contain predetermined limitations, e.g., a limit on the number of commands or length of the session, and/or a limit on which devices to which the host device 1308*a* can issue command or the type of commands (e.g., "on" but not "off") that can be issued. In an embodiment, the host device 1308*a* has multiple stored pre-generated session configuration files, and the host device 1308*a* can choose the appropriate file to use as session data 1406.

In the example shown, the power distribution unit 1300 receives a command 1402*a* to power down an electronic device 1302*a*. The power distribution unit 1300 first verifies 1412 the command 1402*a*. For example, the power distribution unit 1300 determines whether the host device 1308*a* is authorized to issue this command 1402*a* to the particular electronic device 1302*a*. Next the power distribution unit 1300 carries out the command 1402*a*. In the example shown, the power distribution unit 1300 electrically actuates a switch 1414 (e.g., transistor or other appropriate electronic component) associated with the power channel supplying power to the electronic device 1302*a*. The electronic device 1302*a* then powers off.

Next, the power distribution unit 1300 receives a command 1402*a* to power up the electronic device 1302*a*. This scenario is typical of a situation in which the host device 1308*a* is power-cycling the electronic device 1302*a*, for example, because the host device 1308*a* has supplied new program code ("firmware") to the electronic device 1302*a*, and the new program code will be executed as part of a startup sequence of the electronic device 1302*a*. In this example, the power distribution unit 1300 carries out the command by actuating the switch 1414, causing the power channel to supply power to the electronic device 1302*a*. In an embodiment, the command 1402*b* is first verified in the manner described above with respect to the verification of the first command 1402*a*.

The host device 108*a* can continue to issue commands until the session 1404 concludes, e.g., based on the terms of the session described above, such as a number of commands or a time limit. In an embodiment, the host device 108*a* sends a command instructing the power distribution unit 1300 to end the session. For example, a command to end the session can be executed independent of a specified limit on the time or number of commands.

In an embodiment, the power distribution unit 1300 controls power to the electronic device 1302*a* independent of any command issued by the host device 1308*a*. For example, the power distribution unit 1300 measures 1416 a level of current drawn by the electronic device 1302*a*. If the power distribution unit 1300 determines that the level of current exceeds a threshold, e.g., based on an expected operating range of the device, the power distribution unit 1300 actuates the switch 1414 to deactivate the electronic device 1302*a*. In this way, the power distribution unit 1300 can mitigate potential electrical damage by detecting unusual conditions.

Figure 15:
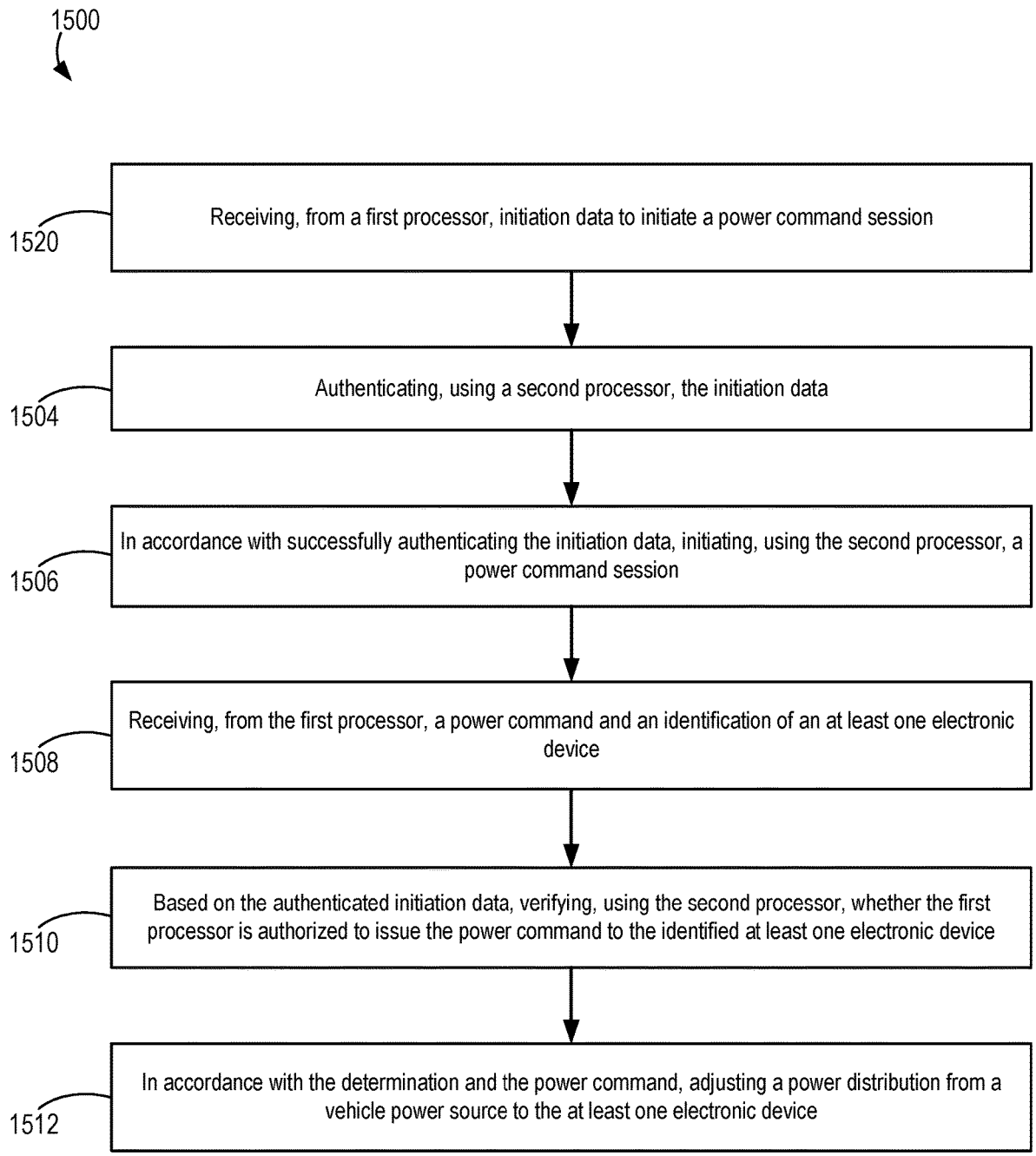
FIG. 15 shows a flowchart of an example process for managing power to electronic devices on a vehicle.

FIG. 15 shows a flowchart of an example process 1500 for controlling power of electronic devices on a vehicle. For example, the process 1500 can be carried out by the processor 1310 of the power distribution unit 1300 shown in FIG. 13. The power distribution unit is configured to control power to at least one electronic device from a power source (e.g., the power source 1330 shown in FIG. 13). The power distribution unit has a processor (e.g., the processor 1310 shown in FIG. 13) configured to execute computer executable instructions stored in a computer-readable medium (e.g., the memory device 1312 shown in FIG. 13). The power distribution unit is configured to communicate with another device (e.g., one of the host devices 1308*a-b* shown in FIG. 13).

The power distribution unit receives 1502, from the host device, initiation data to initiate a power command session. For example, the initiation data is a session configuration file and a time limit or number of commands. In an embodiment, the initiation data is an example of the session data 1406 shown in FIG. 14. In an embodiment, the initiation data is included in a session configuration file chosen from among a collection of pre-authorized session configuration files. In this way, the power distribution unit only initiates sessions characterized by one of several pre-determined configurations. In an embodiment, the initiation data includes an indication of channels authorized for power commands from the host device, and an indication of which power commands are authorized for which channels (e.g., "power on"

is authorized but "power off" is not), wherein at least one of the channels corresponds to the at least one electronic device.

The power distribution unit authenticates 1504 the initiation data, e.g., verifying a digital signature 1410 of the initiation data, as described above with respect to FIG. 14.

In accordance with successfully authenticating the initiation data, the power distribution unit initiates 1506 the power command session. An example power command session 1404 is shown in FIG. 14.

The power distribution unit receives 1508, from the first processor, a power command and an identification of the electronic device. Example power commands 1402*a-b* are shown in FIG. 14.

Based on the authenticated initiation data, the power distribution unit verifies 1510 whether the host device is authorized to issue the power command to the identified at least one electronic device. For example, the power distribution unit accesses session configuration data provided with the initiation data to determine if the host device is in fact authorized to issue this particular command for this particular device.

In accordance with the determination and the power command, the power distribution unit adjusts 1512 a power distribution from the vehicle power source to the electronic device. For example, the power distribution unit powers up or powers down the electronic device.

In an embodiment, the power distribution unit accesses power distribution unit configuration data (e.g., configuration information available in a memory device of the power distribution unit, such as the memory device 1312 shown in FIG. 13). Further, the power distribution unit determines, based on the power distribution unit configuration data, whether the power command meets a validity condition (e.g., so as to not deactivating an essential device while the vehicle is in operation). The power distribution of the electronic device is adjusted in accordance with the determination.

In an embodiment, in accordance with a pre-determined threshold extracted from the initiation data (e.g., a threshold such as a session limit, for example, a number of commands or a time limit), the power distribution unit ends the power command session. For example, the data initiating a power command session includes data representing the threshold, such that ending the power command session includes determining that the session limit has been satisfied.

In an embodiment, the power distribution unit that the at least one electronic device has exceeded an electrical characteristic (e.g., current) threshold, and powers off the electronic device.

In an embodiment, the power distribution unit, over a period of time, measures an electrical characteristic (e.g., voltage or power draw) of the at least one electronic device. In this example, in accordance with the measurement, the power distribution unit determines that the electrical characteristic does not meet a threshold indicating normal limits for the electrical characteristic, and designates the at least one electronic device for maintenance. In this way, the power distribution unit monitors the functionality of electronic devices to determine when maintenance may be necessary based on its electrical characteristics. In an embodiment, the vehicle 100 can take action based on this indication of necessary maintenance, e.g., by flagging the device for inspection when the vehicle is at a maintenance facility.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle, comprising:
   a power source;
   a power distribution unit electrically connected to both the power source and to at least one electronic device, and configured to control power to at least one electronic device from the power source;
   a first processor electrically connected to the power distribution unit and configured for communicating power commands to the power distribution unit;
   wherein the power distribution unit comprises a second processor configured to execute computer executable instructions stored in computer-readable medium for carrying out operations including:
      receiving, from the first processor, initiation data to initiate a power command session, the initiation data comprising session data;
      authenticating, using the second processor, the initiation data based on the session data;
      in accordance with successfully authenticating the initiation data, initiating, using the second processor, the power command session;
      receiving, from the first processor, a power command and an identification of the at least one electronic device;
      based on the authenticated initiation data, verifying, using the second processor, whether the first processor is authorized to issue the power command to the identified at least one electronic device; and
      in accordance with the determination and the power command, adjusting a power distribution from the vehicle power source to the at least one electronic device.

2. The vehicle of claim 1, the operations including:
   determining that the at least one electronic device has exceeded an electrical characteristic threshold, and powering off the at least one electronic device.

3. The vehicle of claim 1, the operations including:
   over a period of time, measuring an electrical characteristic of the at least one electronic device,
   in accordance with the measurement, determining that the electrical characteristic does not meet a threshold indicating normal limits for the electrical characteristic, and
   designating the at least one electronic device for maintenance.

4. The vehicle of claim 1, the operations including, in accordance with a pre-determined threshold extracted from the initiation data, ending the power command session.

5. The vehicle of claim 4, wherein the data initiating a power command session includes a session limit, and wherein ending the power command session includes determining that the session limit has been satisfied.

6. The vehicle of claim 1, the operations including:
accessing power distribution unit configuration data,
determining based on the power distribution unit configuration data, whether the power command meets a validity condition, and
adjusting the power distribution of the electronic device in accordance with the determination.

7. The vehicle of claim 1, wherein the data initiating a power command session includes an indication of channels authorized for power commands from the first processor, and an indication of which power commands are authorized for which channels, wherein at least one of the channels corresponds to the at least one electronic device.

8. The vehicle of claim 1, wherein the power distribution unit comprises a set of power channels corresponding to respective electronic devices.

9. The vehicle of claim 8, wherein adjusting the power distribution from the vehicle power source to the electronic device comprises adjusting the power distribution of the power channel corresponding to the electronic device.

10. The vehicle of claim 8, wherein adjusting the power distribution from the vehicle power source to the electronic device comprises actuating an electronic switch of the power channel.

11. The vehicle of claim 1, wherein the session data comprises a digital signature for the first processor; and
wherein authenticating, using the second processor, the initiation data based on the session data comprises verifying the digital signature from the session data.

12. The vehicle of claim 11, further comprising a memory device, the memory device storing an encryption key used to authenticate the digital signature.

13. The vehicle of claim 1, wherein the session data comprises one or both of a number of commands to be executed during the session and a time limit for the power command session.

14. A method performed by a power distribution unit of a vehicle, the method comprising:
receiving, from a first processor, initiation data to initiate a power command session, the initiation data comprising session data pertaining to a power command session;
authenticating, using a second processor electrically connected to the first processor, the initiation data;
in accordance with successfully authenticating the initiation data, initiating, using the second processor, the power command session;
receiving, from the first processor, a power command and an identification of an at least one electronic device;
based on the authenticated initiation data, verifying, using the second processor, whether the first processor is authorized to issue the power command to the identified at least one electronic device; and
in accordance with the determination and the power command, adjusting a power distribution, by the second processor, from a vehicle power source to the at least one electronic device.

15. The method of claim 14, comprising:
determining that the at least one electronic device has exceeded an electrical characteristic threshold, and powering off the at least one electronic device.

16. The method of claim 14, comprising:
over a period of time, measuring an electrical characteristic of the at least one electronic device,
in accordance with the measurement, determining that the electrical characteristic does not meet a threshold indicating normal limits for the electrical characteristic, and
designating the at least one electronic device for maintenance.

17. The method of claim 14, comprising, in accordance with a pre-determined threshold extracted from the initiation data, ending the power command session.

18. The method of claim 17, wherein the data initiating a power command session includes a session limit, and wherein ending the power command session includes determining that the session limit has been satisfied.

19. The method of claim 14, comprising:
accessing power distribution unit configuration data,
determining based on the power distribution unit configuration data, whether the power command meets a validity condition, and
adjusting the power distribution of the electronic device in accordance with the determination.

20. The method of claim 14, wherein the data initiating a power command session includes an indication of channels authorized for power commands from the first processor, and an indication of which power commands are authorized for which channels, wherein at least one of the channels corresponds to the at least one electronic device.

21. The method of claim 14, wherein the power distribution unit comprises a set of power channels corresponding to respective electronic devices.

22. The method of claim 21, wherein adjusting the power distribution from the vehicle power source to the electronic device comprises adjusting the power distribution of the power channel corresponding to the electronic device.

23. The method of claim 21, wherein adjusting the power distribution from the vehicle power source to the electronic device comprises actuating an electronic switch of the power channel.

24. The method of claim 14, wherein the session data comprises a digital signature for the first processor; and
wherein authenticating, using the second processor, the initiation data based on the session data comprises verifying the digital signature from the session data.

25. The method of claim 24, comprising storing an encryption key in a memory associated with the vehicle; and
verifying the digital signature comprises verifying the digital signature using the encryption key stored in the memory.

26. The method of claim 14, wherein the session data comprises one or both of a number of commands to be executed during the session and a time limit for the power command session.

27. One or more non-transitory computer-readable storage media storing instructions which, when executed by a second processor of a power distribution unit in a vehicle, cause operations comprising:
receiving, from a first processor, initiation data to initiate a power command session, the initiation data comprising session data pertaining to the power command session;
authenticating, using the second processor electrically coupled to the first processor, the initiation data based on the session data;
in accordance with successfully authenticating the initiation data, initiating, using the second processor, the power command session;
receiving, from the first processor, a power command and an identification of an at least one electronic device;

based on the authenticated initiation data, verifying, using the second processor, whether the first processor is authorized to issue the power command to the identified at least one electronic device; and in accordance with the determination and the power command, adjusting a power distribution, by the second processor, from a vehicle power source to the at least one electronic device.

28. The one or more non-transitory computer-readable storage media of claim 27, wherein the session data comprises a digital signature for the first processor; and wherein authenticating, using the second processor, the initiation data based on the session data comprises verifying the digital signature from the session data.

29. The one or more non-transitory computer-readable storage media of claim 28, wherein verifying the digital signature from the session data comprises verifying the digital signature using an encryption key stored in the one or more non-transitory computer-readable storage media.

30. The one or more non-transitory computer-readable storage media of claim 27, wherein the session data comprises one or both of a number of commands to be executed during the session and a time limit for the power command session.

* * * * *